United States Patent
Bode

[15] 3,700,111
[45] Oct. 24, 1972

[54] LAMINAR FLOW FLUID FILTER
[72] Inventor: James Daniel Bode, Royal Oak, Mich.
[73] Assignee: The Bendix Corporation
[22] Filed: Dec. 22, 1969
[21] Appl. No.: 887,102

[52] U.S. Cl..................................210/322, 210/488
[51] Int. Cl. .............................................B01d 43/00
[58] Field of Search.......210/320, 322, 294, 336, 488

[56] References Cited

UNITED STATES PATENTS

| | | |
|---|---|---|
| 3,397,794 | 8/1968 | Toth et al...................210/488 |
| 3,450,264 | 6/1969 | Graybill..................210/320 X |
| 3,503,514 | 3/1970 | Lawson..................210/336 X |
| 2,207,399 | 7/1940 | Gaertner................210/304 X |

*Primary Examiner*—Frank A. Spear, Jr.
*Attorney*—William F. Thornton and Plante, Hartz, Smith & Thompson

[57] ABSTRACT

A stacked washer multi-stage impaction and diffusion filtering apparatus wherein a succession of laminar flow channels terminated by impact target surfaces are arranged to form intricate channel systems on individual filter washers, the washers then being stacked to form a plurality of filter passages. The intricate channel system permits establishment of a large number of filtration stages within a given volume.

18 Claims, 9 Drawing Figures

PATENTED OCT 24 1972

INVENTOR.
J. Daniel Bode
BY William F. Thornton
ATTORNEY.

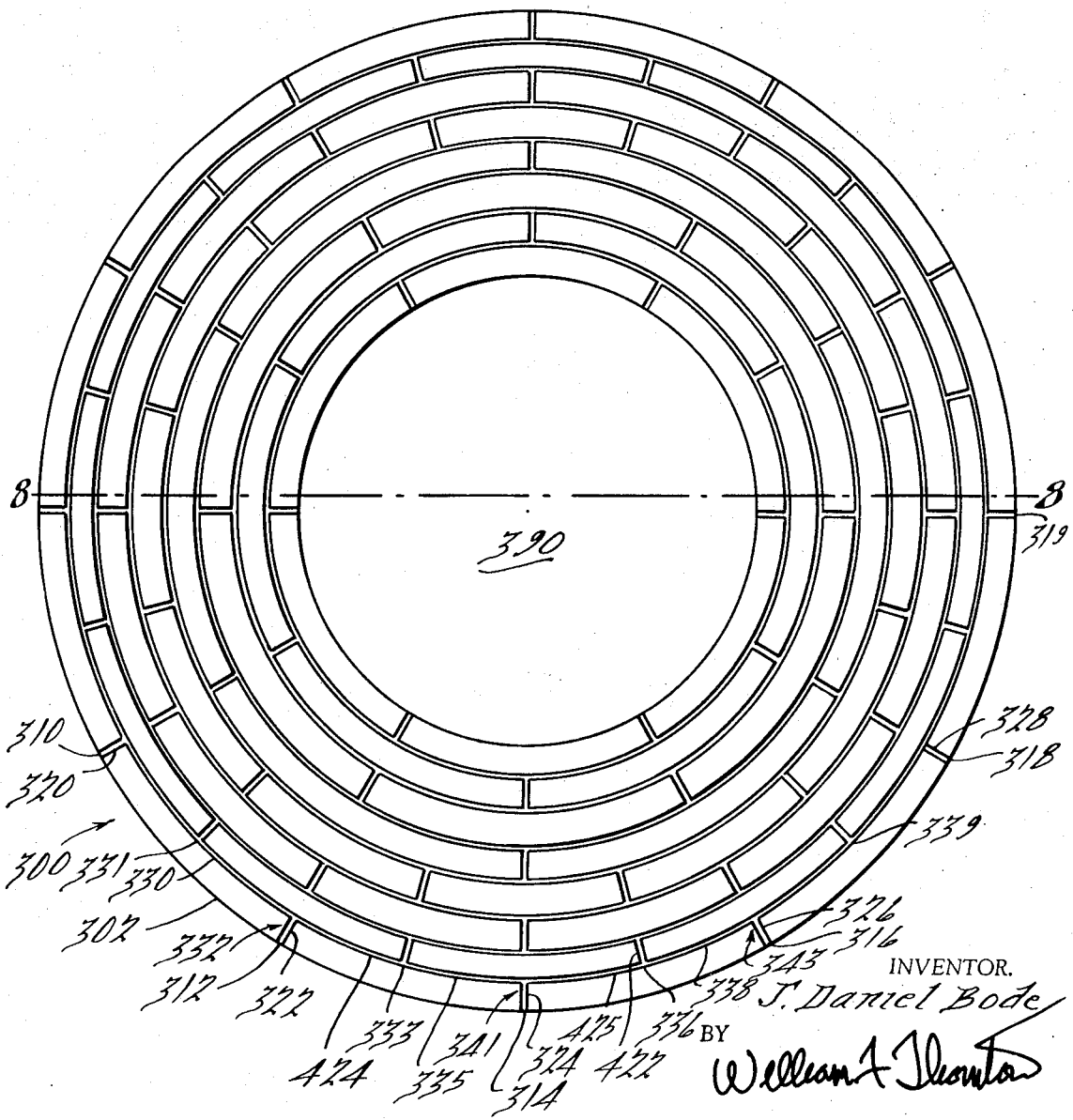

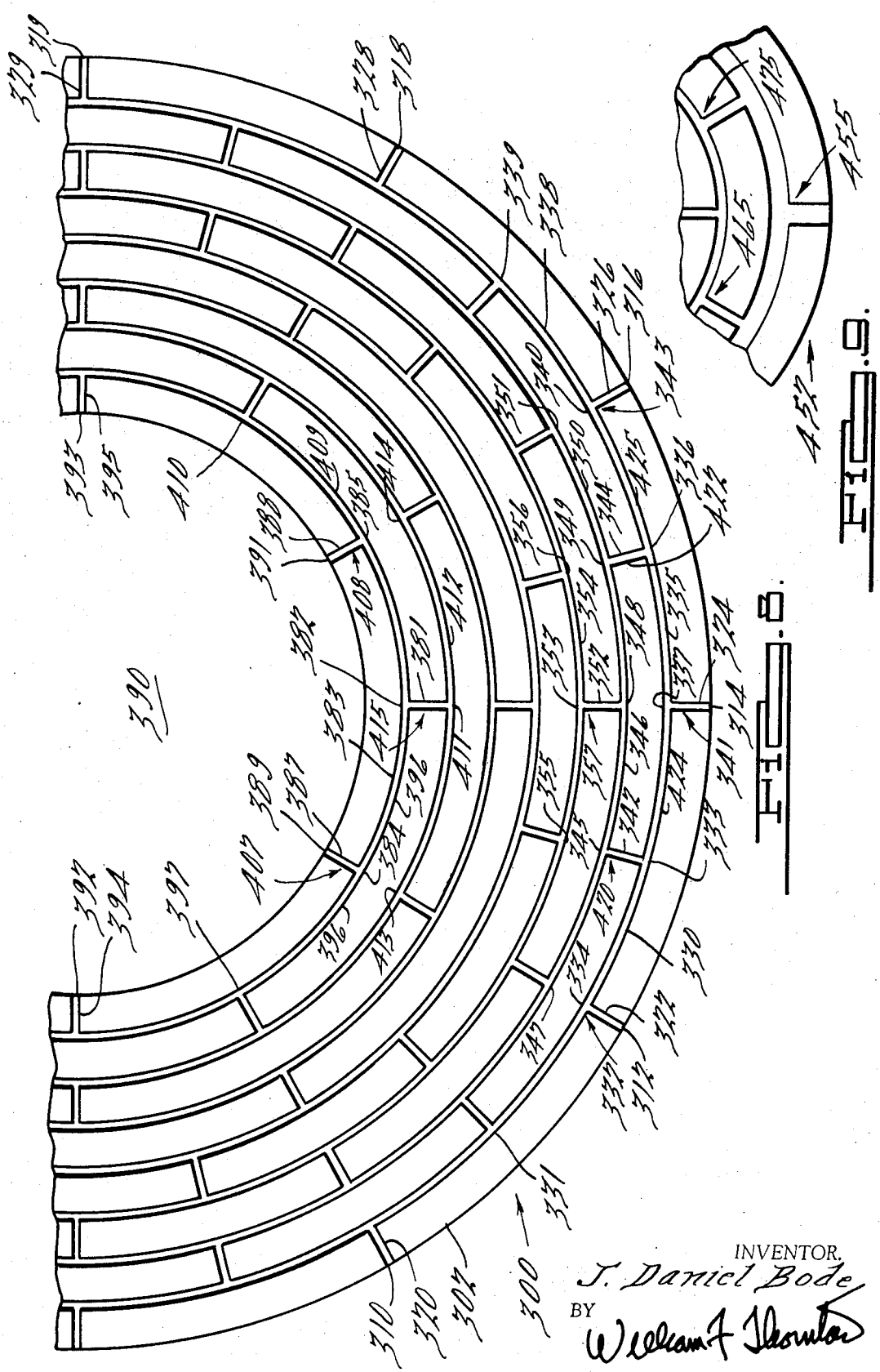

LAMINAR FLOW FLUID FILTER

BACKGROUND OF THE INVENTION

Fluid filtering requirements continually become more stringent as levels of industrial pollution increase. In addition, modern fluidic and pneumatic devices require ever increasing levels of purity for dependable operation. To meet these increasingly rigorous requirements, filters must remove particles of ever decreasing size. The greatest need for improved filter devices is for liquid and gas filter units capable of removing extremely small particles such as those between 0.1 and 10 microns in diameter.

Particles are seldom perfectly spherical and thus do not really have "diameters." However, for the mathematical computations involved in most filter system planning, it is helpful to assume particles are spherical and do have "diameters." When speaking of particle size, I shall henceforth presume that every particle can be assigned a diameter.

Few commerically available filters are effective when particles are smaller than 5 microns in diameter, and those that are effective are often large and cumbersome. Among the known filtration methods for purifying liquid or gaseous fluid flow are gravitational settling, sieving with woven or electroformed screens, centrifugal separation, interception, electrostatic removal, diffusion, and impaction. Many of these filtration methods are not capable of removing particles in the 10 to 0.1 microns diameter range.

The gravitational settling technique is unreliable for particles of less than 40 microns diameter. The velocity of the fluid flow within most filters is adequate to prevent the gravitational settling of any smaller particles.

Sieving techniques are impractical when the particle diameter is below 40 microns. Sieving requires the use of fine mesh screens to accomplish the filtering operation. Successful sieving is complicated by the fact that particle shapes are irregular and screen openings are usually square or rectangular. It is further complicated by the fact that there are limits to how small screen openings can be made. The use of a screen often encourages build-up on the screen of a layer of silt called a "filter cake." This layer can produce undesirable pressure drops across the screen which may damage the screen since fine mesh is easily damaged. As a result, sieving has been found impractical for particles of less than 40 microns diameter.

Centrifugal separation devices filter by forcing the fluid into circular or spiral paths. Centrifugal forces in the filter exert greater outward forces on particles than on fluid molecules since particles have substantially more mass. Particles are thus forced radially outward and lodge against the outer surfaces of the curved passages where adhesive forces between particles and passages retain them. This separation technique removes particles as small as 10 microns diameter but is impractical for smaller particles.

The interception method of filtration removes particles by making them contact a post or other intercepting element in the flow stream. This method functions effectively only when the diameter of the intercepting element is smaller than the diameters of the particles to be removed. If the diameter of the intercepting element is not smaller, the flow velocity must be very high to obtain efficient filtering. It is difficult to make interception elements of small enough diameter to be useful when extremely small particles must be removed. In addition, the particle must still contact the element and if it does not, there is no chance of removal. The interception method is effective in removing particles as small as 0.5 microns diameter.

Electrostatic removal can separate particles of 1 micron and larger diameters from fluid, but to be effective, the particle should be charged and must be brought into contact with a charged collecting element. Electrostatic removal is theoretically helpful for removing particles in the 10 to 0.1 microns diameter range, but natural electrostatic charging is unreliable since appreciable time is required for particles to acquire adequate charges even when passed through a charging region, and the magnitude of each charge is affected by a particle's size and dielectric properties.

Diffusion filtering is an extremely effective method for removing particles of less than 0.1 microns diameter. Diffusion removal depends on the wayward motion added to a particle's direct movement due to bombardment by fluid molecules. This bombardment, which is known as Brownian movement, is effective only when particles are smaller than 0.1 microns diameter. Diffusion collection, then by its very nature, is limited to very small particles, i.e., less than 0.1 microns in diameter. Diffusion filtration can occur at any fluid velocity but becomes increasingly efficient as velocity decreases. If the fluid velocity can be made low enough, the efficiency of filtration can be made to approach 100 percent. The term "efficiency" refers to the ratio of particles removed from the fluid during filtration to particles in the fluid prior to filtration.

Impaction filtering is an excellent method for removing particles ranging from 100 to 0.1 microns diameter. In the prior art, impaction filtering has been accomplished by cumbersome impact baffles and labyrinthine mazes which guide flowing fluid on collision courses with the impact baffles. The prior art procedure has been to guide the fluid into collision with a large number of baffles, and this collision process is repeated until the desired degree of filtration has been obtained. This procedure is adequate if particle sizes are larger than 2.5 microns, but smaller particles often flow between baffles instead of colliding with them. The effectiveness of these prior art impact filtering devices has always been reduced by turbulence occurring prior to the impaction and such turbulence has been virtually accepted and ignored. This turbulence greatly decreases filtering efficiency because turbulent flow prior to impaction causes flowing fluid to retain and carry particles around the impact surface rather than allowing them to collide with the surface. It is desirable to diminish these turbulent effects as much as possible. By doing so, impaction efficiency can be increased substantially and filtering improved greatly. The present invention overcomes this turbulence problem.

Another shortcoming of prior art impact filters is that these filters are often large, and unusable in applications where compactness is a factor. The present invention is embodied in a filter which is extremely compact, light, and easy to build.

SUMMARY OF THE INVENTION

This invention comprises a filtration system for the removal of particles from flowing fluids, and can be adapted to remove a wide range of particle sizes. The invention utilizes a laminar flow channel to establish laminar fluid flow and at a point near the end of the channel where flow has become laminar, removal means extract contaminant particles. The removal means may utilize impaction, interception, diffusion, gravity settling, or centrifugal separation. Laminar flow has been found to substantially improve filtering efficiency with each of these filtration methods.

This invention is shown embodied in an apparatus for removing extremely small particles of 0.1 through 10 microns diameter from flowing fluid. The term "particles" as used herein applies not only to solid contaminants but also to droplets of liquid or mist. Filtering action in the shown embodiments is accomplished principally by impaction filtering. However, the apparatus also utilizes the diffusion filtering method to provide additional filtration. The invention, if desired, can be adapted to removing larger particles of any desired size.

Impaction filtering is an effective method for removing particles from fluid if the particles collide with an impact target surface. If particles collide, they attach themselves to the impact target surface and are retained by adhesive forces between surface and particles. Impaction becomes an increasingly undependable process, however, if the fluid flow is turbulent when it reaches the impact target surface. In turbulent regions, velocities within the flow stream are random, and particles move in every direction. As a result, many particles have no component directed toward the impact target surface, and the random velocity of the fluid can often carry such particles around the impact target surface without collision. This turbulence is a major shortcoming of prior art impaction filters. Impaction filtering efficiency is substantially improved by this invention's unique combination of flow passages which is designed to greatly diminish turbulence by establishing laminar fluid flow prior to each impaction. Establishment of laminar flow causes a greatly increased number of particles to collide with impact target surfaces and thus be removed from the fluid. To establish laminar flow, the invention utilizes straight, smooth flow passages of ample length to eliminate the turbulence ordinarily occuring prior to impaction in prior art filters. It also has an intricate system of connecting passages which, among other things, permit establishment of a maximum number of impactions in a given space.

For purposes of this invention, the term "laminar flow" refers to flow in which there is little or no turbulence. In turbulent flow, the fluid velocity at any fixed point fluctuates with time in a nearly random way. In any physically realizable system, turbulence is never completely eliminated. Herein I describe as "laminar" any flow that is substantially free of turbulence.

Improved impaction filtering is accomplished by guiding the fluid along a laminar flow passage to establish laminar flow, and then allowing this fluid to collide with an impact target surface which is positioned at the downstream end of the laminar flow passage.

Although impaction is the principle filtration method used in my invention, diffusion is utilized to further increase filtration efficiency. After each impaction of fluid against an impact target surface, my unique channel system divides the fluid flow into two separate streams of fluid, each flowing at approximately half the velocity prior to impaction. This reduction in velocity greatly improves diffusion filtering. The reduced flow velocity continues until the fluid has been conducted to the upstream end of a laminar flow passage of the next filtration stage. At that point, pairs of such lowered velocity flow streams are combined, and the original higher velocity existant prior to the previous impaction is restored so as to provide more effective impact filtering at the next impact target surface. After being combined, the united fluid stream is channeled into the upstream end of another laminar flow passage to establish laminar flow. At the downstream end of this laminar flow passage, when flow is essentially laminar, the fluid is impacted against an impact target surface. This filtration process is repeated again and again until fluid has been filtered to the desired degree of purity. The filtration action of my apparatus will be discussed in still further detail hereafter.

The invention is shown embodied in a system of thin annular washers which can be compactly aligned to form a stacked washer filter element. An intricately designed system of filter channels is formed on one surface of each washer. Two basic channel design systems are disclosed. The washer stack can be easily disassembled for cleaning and need not be discarded when saturated with contaminant particles.

Washers can be fabricated of materials capable of withstanding high temperatures and pressures. When appropriate materials are selected, the filter can be used in situations requiring temperatures as high as 1000° Centigrade. Pressure differentials as high as 5,000 psi across the washer stack present no collapse problem. The invention can, if desired, be embodied so as to withstand even greater temperatures and pressures.

It is desirable for a filter to be operational regardless of the direction of flow. Accordingly, the present invention functions equally well when the direction of fluid flow is reversed.

It is also desirable that each filter stage be protected from frequent clogging. To accomplish this objective, the invention has an alternative flow channel at every stage of the filter. In the event a single channel becomes obstructed, there is always an alternative path for the fluid to follow. This uniquely designed filter system thus prevents most clogging problems commonly occurring with other filters.

Still other advantages of the invention are that it is durable, compact, resistant to shock and rough handling, easy to manufacture, and simple to assemble.

BRIEF DESCRIPTION OF THE DRAWINGS

FIG. 4 is an enlarged top view of a laminar flow channel like that of FIG. 3 terminated by a different type of impact target surface.

FIG. 5 is an enlarged top view of a laminar flow channel like that of FIG. 3 terminated by still another type of impact target surface.

FIG. 6 is an enlarged edge view of three stacked washers like those in FIG. 2 showing openings for fluid to enter the channel systems of the washer stack.

FIG. 7 is an enlarged top view of a filter washer plate like that shown in FIG. 2 having a second type of filter channel system embodying the invention.

FIG. 8 is an enlarged top view of a portion of the washer plate shown in FIG. 7.

FIG. 9 is an enlarged top view of a portion of a washer plate in which the effective diameter of passages is not uniform throughout the filter.

DESCRIPTION AND OPERATION OF THE PREFERRED EMBODIMENTS

Figure 1:
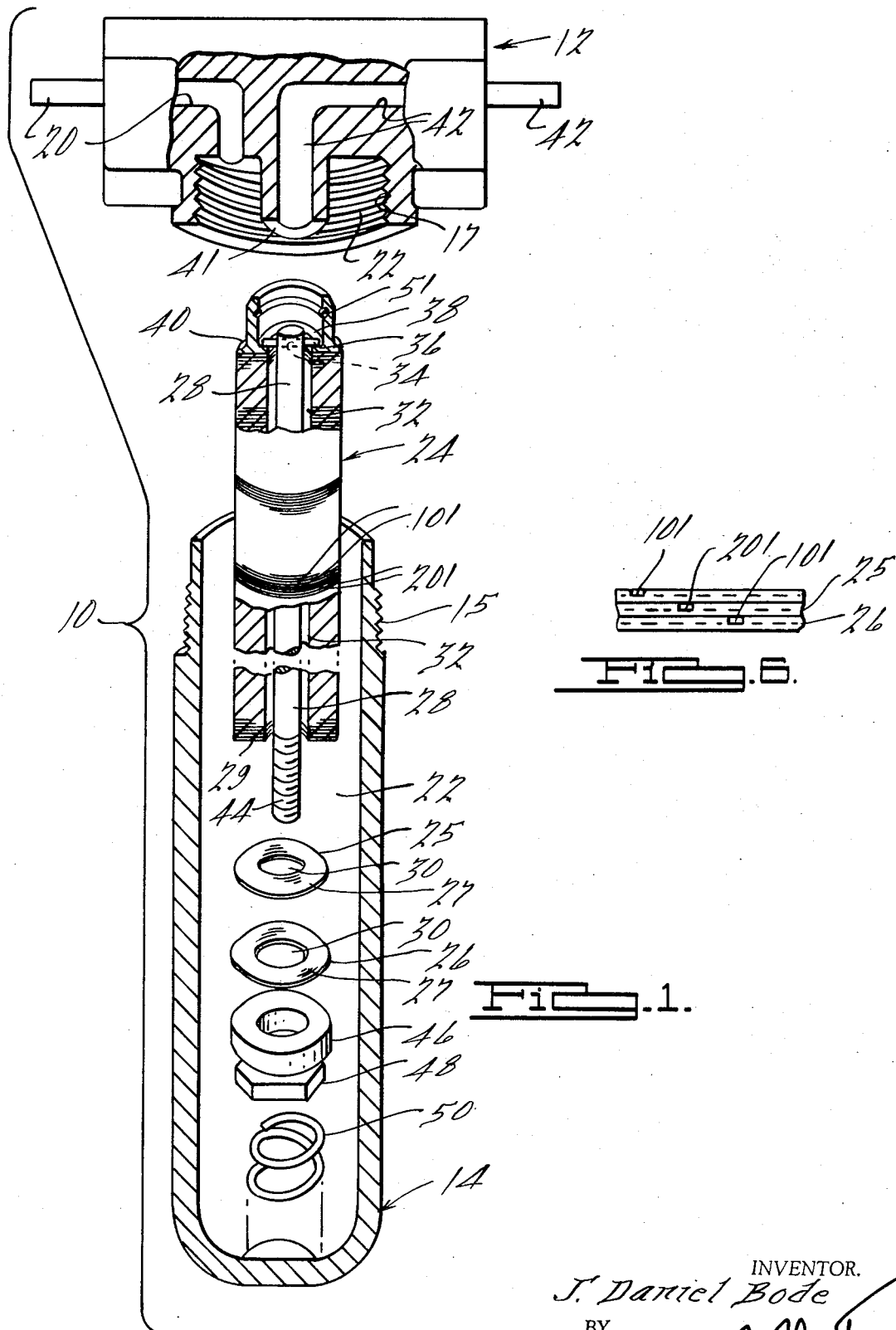
FIG. 1 is an exploded sectional view of a stacked washer filter embodying the present invention.

The invention is shown in FIG. 1 embodied in a stacked washer fluid filter assembly indicated generally at 10. The filter assembly 10 has a head 12 and a casing 14. The casing 14 has casing threads 15 which cooperate with head threads 17 to attach the head 12 to the casing 14 and provide a fluid tight seal. An inlet passage 20 in the head guides incoming fluid to a reservoir 22; the reservoir occupies much of the interior of both the lower casing 14 and the head 12. A washer stack 24, formed of thin flat annular filter washers, such as washers 25 and 26, having a system of flow channels 27 thereon, is positioned within the reservoir 22. The many washers of washer stack 24 are aligned and centered about a rod 28 which is passed through the core 30 of each washer. The washer stack 24 may contain several thousand filter washers depending on the quantity of fluid to be filtered.

A hole 34 is bored diametrically through the upper end of the rod 28, and pin 36, which is passed through hole 34, cooperates with annular ridge 38 in upper collar 40 to hold the upper end of rod 28 to upper collar 40 when the washer stack 24 is fully assembled. The diameter of rod 28 is selected to permit ample clearance between it and washer stack core 32 so fluid can flow from washer stack core 32 through collar 40, and finally into outlet passage 42.

The lower end of rod 28 is provided with rod thread 44. When the individual washers are properly aligned about rod 28, a lower collar 46 is placed in communication with the lower face of the bottom washer 26 of the stack 24 and rod nut 48 is tightened securely onto rod thread 44 until the individual filter washers 26 are securely compressed against one another. The lower collar 46 distributes the force evenly over the surface area of the lowest washer 26.

When the parts of filter assembly 10 are assembled and the casing 14 threaded into head 12, casing spring 50 keeps upper collar 40 of washer stack 24 in mating relationship with outlet tube 41. Upper collar 40 is provided with a gasket 51 to provide a fluid tight seal between the outlet tube 41 and upper collar 40.

Figure 2:
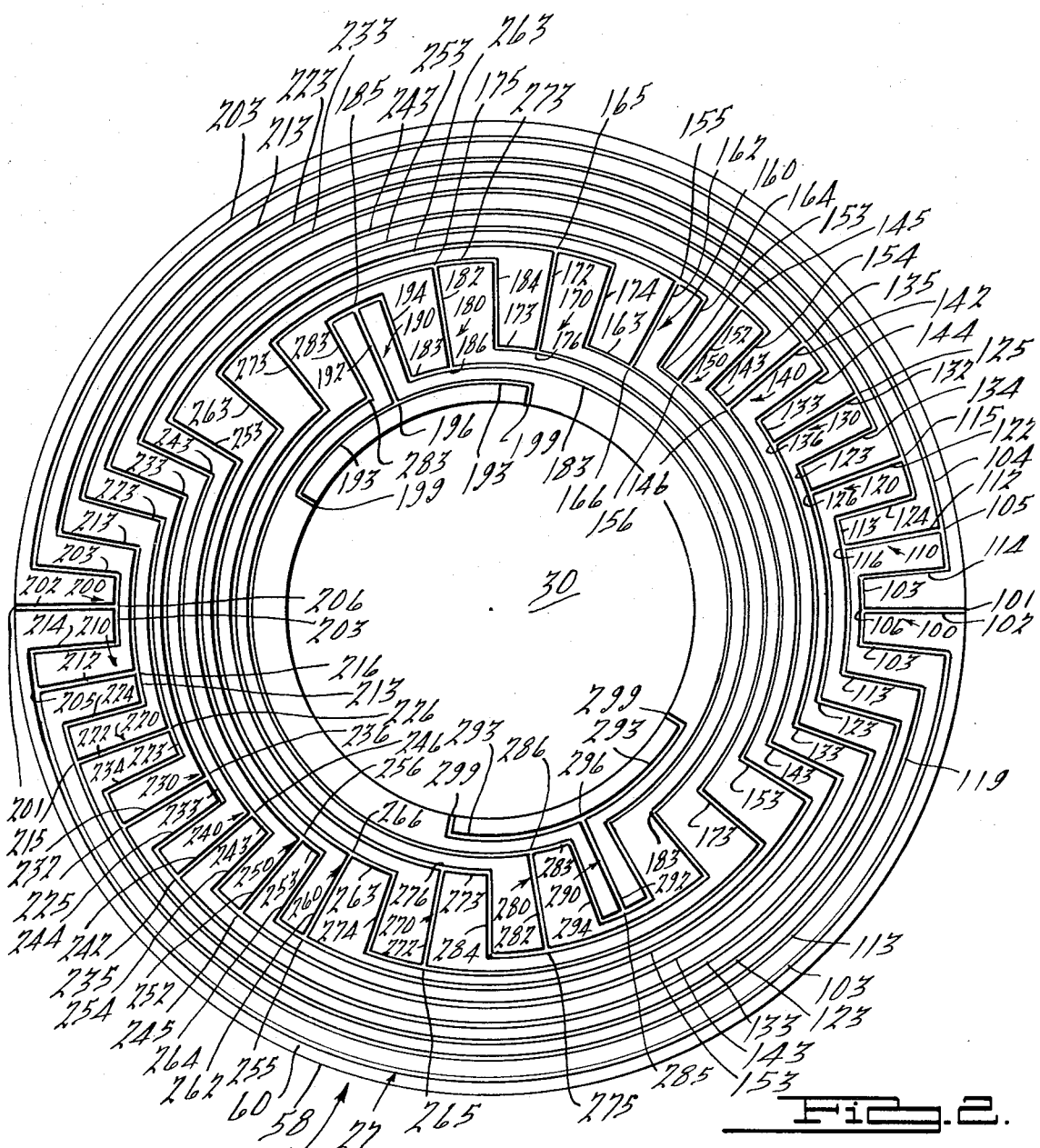
FIG. 2 is an enlarged top view of a filter washer plate having a novel filter channel system embodying the invention and usable in the filter of FIG. 1.

FIG. 2 is an enlarged top view of a filter washer plate like that shown at 25 in FIG. 1. Filter washer plate 25 (FIG. 2) is shown as a thin flat annular disc having a central core 30, an outer edge 58, and an intricate flow channel system 27 formed in a flat first surface 60. The flat lower face or second surface (not shown) has no channel system and acts as closure means for the flow channel system of an abutting lower filter washer plate such as plate 26 (FIG. 1). The washer channel system of the invention can be formed on or in almost any body or on or in any plate and does not require an annular washer. A body, either unitary or with a plurality of parts, can contain the channel system. Any plate seated against the channel system side of a filter plate can provide closure means for the channels thus forming a system of passages.

The filter channel system 27 can be formed as a system of passages within a body. If desired, a channel system such as system 27 can be formed on both first and second surfaces of the filter washer plate 25 (FIG. 2). When assembled into a washer stack, such washers would be spaced from one another by a blank washer (not shown), i.e., without channels on first and second surfaces.

The flow channel system 27 shown in FIG. 2 is most easily understood if one first examines a single filtration structure located thereon. Each filtration structure consists of three basic elements, namely a laminar flow channel, a connecting channel which intersects the laminar flow channel, forms an impact target surface at its intersection therewith, and extends between the laminar flow channels of two successive structures (if there are successive structures), and closure means to cover the channels and thereby convert them to passages which prevent escape of flowing fluid. It should be understood that the impact target surface is but one type of removal means, and that other types of removal means can readily be substituted for the impact target surface as will be explained in further detail hereafter. I have shown my invention embodied in an impaction filter because impaction is an excellent filtration method to remove particles in the size range which today presents the greatest challenge to the filter art.

Referring to FIG. 2, a typical filtration structure 110 has a laminar flow channel 112, a connecting channel 113, and an impact target surface located adjacent point 116. Connecting channel 113 extends from point 115, where it joins the upstream end of a successive laminar flow channel 122 associated with filtration structure 120 to point 215 where it joins a laminar flow channel 222 associated with an identical filtration structure 220. Closure means are here provided by the second surface 29 (FIG. 1) of an adjacent washer. Filtration structures 110 and 210 (FIG. 2) make up a filtration stage, namely, the second stage of the filter system as will hereafter be explained in more detail. Every filtration structure of the many structures which form the intricate flow channel system 27 of washer 25 functions in the same way and has elements identical to those just described. The width and depth of individual channels remain constant throughout the channel system shown in FIG. 2 although this is not essential, as will be discussed hereafter.

Figure 3:
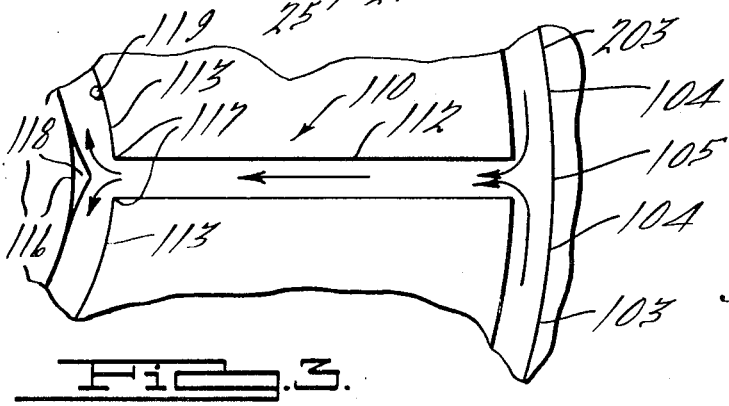
FIG. 3 is a further enlarged top view of a portion of FIG. 2 showing a laminar flow channel terminated by one type of impact target surface.

FIG. 3 is an enlarged top view of a portion of filter structure 110 showing laminar flow channel 112, connecting channel 113, and the impact target surface adjacent point 116. The function and operation of each element of the structure 110 will now be explained in detail using FIG. 3. The following explanation presumes that closure means is present to prevent fluid from escaping from the open channels, but in the interest of clarity such means is not shown in FIG. 3. It is to be understood, however, that when in operation the channels must be covered to form passages. In the following explanation of FIG. 3, I shall refer to the channels as "channels." However, when closure means is applied to the open channels or when the "channels are inside a body they become "passages." Although FIG. 3 is an enlargement of a structure shown on the washer of FIG. 2, it should be added that the details of construction, design, and operation are equally applicable to the filtration structures shown in FIG. 7 and 8 which will be explained in detail hereafter. The connecting channels in FIG. 3 are shown only in part. The filtration structure indicated generally at 110, has a laminar flow channel 112 and a connecting channel 113 intersecting the laminar flow channel 112. Fluid enters the filtration structure 110 near point 105, where connecting channels 103 and 203 of a previous filtration stage join the upstream end of laminar flow channel 112. The direction of fluid flow in filter structure 110 is indicated by flow arrow.

At the downstream end of laminar flow channel 112, connecting channel 113 not only intersects channel 112 to conduct fluid to successive filtration structures, but also provides removal means in the form of an impact target surface adjacent point 116 opposite the downstream end of laminar flow channel 112.

It has been found that the best impaction filtering is obtained when an impact target surface terminates a region of laminar flow. Accordingly, laminar flow channel 112 is carefully designed to insure that fluid flowing therein will attain laminar flow characteristics by the time it reaches the downstream end of channel 112. Laminar flow channels should be straight, smooth, and free of obstructions because curvature, roughness, or obstructions can generate turbulence. To be certain that flow is substantially laminar by the time it reaches the end of the channel 112, the channel 112 should be substantially straight with a length to effective diameter ratio of at least 10 to 1. It has been found that ratios between 20 to 1 and 30 to 1 establish excellent laminar flow. The term "effective diameter" refers to the diameter of a circle encompassing an area equal to the cross sectional area of the laminar flow channel. It is not essential that each laminar flow channel have the same length, but for convenience of placing it on a filter washer surface, it is sometimes helpful.

Once laminar flow has been established, particles in the fluid travel at essentially the same velocity as the fluid. When the fluid flowing in laminar flow channel 112 reaches the intersection with connecting channel 113, the fluid is forced to divide substantially equally to left and right. The momentum of most particles traveling with the fluid is sufficient to prevent them from being carried with the fluid around the corners 117. As a result, many of these particles collide with the surface region opposite the downstream end of laminar flow channel 112. This surface region is herein called an "impact target surface." Particles colliding with the impact target surface adjacent point 116 adhere thereto due to adhesive force between particles and surface commonly known as van der Waal's force. An accumulation of particles on the impact target surface of filtration structure 110 is shown at 118.

When fluid initially enters the upstream end of laminar flow channel 112 the fluid flow is turbulent. As it proceeds along the laminar flow channel 112 it gradually becomes laminar. The only turbulence which can be expected in laminar flow channel 112, once initial turbulence has subsided, is small amounts of turbulence generated by minor surface irregularities on the inside surface of the channel. For our purpose, these effects are negligible, and flow at the downstream ends of laminar flow channels can be described as "laminar." As the fluid reaches connecting channel 113 and divides to left and right to follow channel 113, some turbulence is introduced. The presence of a turn always generates turbulence. This turbulence, however, at operating velocities and pressures will be confined to connecting channel 113 and will not adversely affect the laminar flow in laminar flow channel 112.

Flow leaving laminar flow channel 112 is divided into two substantially equal flow streams as it enters connecting channel 113 in order to reduce the velocity of the fluid flow. This reduction in velocity helps to minimize the level of turbulence adjacent to impact target surface 116. Since the width and depth dimensions of channel 113 are essentially equal to those of channel 112, the fluid velocity in channel 113 is approximately half the velocity of fluid flow in laminar flow channel 112. In short, velocity has been halved by doubling the total cross sectional area of flow channels; since fluid leaving laminar flow channel 110 encounters twice as much channel volume as it enters connecting channel 113, the flow velocity automatically drops by about half. This reduced velocity improves diffusion filtering in the connecting channels shown in FIGS. 2 and 3. At 119 (FIGS. 2 and 3) a small particle (shown much enlarged) is lodged against a connecting channel 113; this particle, which was removed from the flow stream by diffusion, is held to the channel wall by van der Waal's force.

It should be noted that connecting channels such as 113 (FIG. 3) conduct fluid to the successive filtration stage by two routes. Thus, even if the left (or right) portion of the connecting channel 113 should become obstructed, the fluid always has an alternative path to the next stage. If a laminar flow channel should clog, the connecting channel of the previous stage then provides an alternate path around the clogged laminar flow channel.

With reference to FIG. 3, if the direction of flow in laminar flow channel 112 is reversed (so as to be in directions opposite to the shown flow arrows) an impact target surface is formed adjacent point 105 where connecting channel 104 has its juncture with laminar flow channel 112. The filtration structure 110 thus has impaction filtering occurring adjacent point 105 instead of 116. Flow would enter the laminar flow channel 112 adjacent point 116 which would now be at the upstream end of the laminar flow channel. Particle accumulation 118 and lodged particle 119 would, of course, then occur in channel 104. It is thus clear that with the filtration structure 110, the direction of flow has no effect on filtering efficiency.

It should be understood that when the flow direction is opposite to the shown arrows, the connecting channel associated with the filtration structure 110 is no longer channel 113 because the connecting channel must be located at the downstream end of laminar flow channel 112. Thus, the connecting channel for filtration structure 110 would be channel 104, which extends between points 106 and 206. Throughout this specification, the term "connecting channel" shall always refer to a channel located at the downstream end of a laminar flow channel extending to the upstream end or between the upstream ends of successive laminar flow channels if there are successive laminar flow channels. If not, the connecting channel is connected to exit means. The term "connecting passage" has a like meaning but applies to channels which have been closed to form "passages."

The impact target surface adjacent point 116 shown in FIG. 3 is but one type of impact target surface which can be used with the invention. Connecting channel 113 need not be formed from an arc of a circle as shown in FIGS. 2 and 3; connecting channel 113 and the impact target surface formed thereby will function equally well if connecting channel 113 has a straight line portion intersecting channel 112. Operation is, of course, identical with a straight connecting channel and will not be described further.

Another type of impact target surface is shown in FIG. 4. There laminar flow channel 61 is terminated at its downstream end by connecting channel 63 which changes direction as it joins channel 61 to form a pointed junction area 65. An impact target surface is formed adjacent point 67 by the junction, and an accumulation of particles 69 is shown on the impact target surface. The direction of fluid flow through the channels is indicated by flow arrows. Fluid flows from the upstream end of laminar flow channel 61 along channel 61 until it strikes an impact target surface adjacent point 67 where particles are removed and the flow divided to right and left into connecting channel 63. In the connecting channel, diffusion filtering occurs and additional particles are removed.

If the direction of flow indicated by the flow arrows in FIG. 4 is reversed, the filter structure of FIG. 4 functions equally well. If reversed, fluid in laminar flow channel 61 is directed toward point 60 and the impact target surface is formed by connecting channel 62 adjacent point 60. The fact that fluid flowing in the structure of FIG. 4 must undergo a sharper turn at the impact target surface should make the filtration slightly more efficient than the essentially right angle turn at the impact target surface adjacent point 116 in FIG. 3. The structure of FIG. 3, however, is better suited for applications requiring compactness.

Still another type of impact target surface is illustrated in FIG. 5. The direction of fluid flow in FIG. 5 is indicated by flow arrows. There laminar flow channel 71 intersects connecting channel 73 to form fork junction 75. Fluid passing down laminar flow channel 71 collides with an impact target surface adjacent point 77 formed by the inner surface of connecting channel 73. Particles colliding with the impact target surface build up a particle accumulation 79. Fluid flow divides to right and left as it enters connecting channel 73. Additional particles are removed by diffusion in channel 73. The filtration structure of FIG. 5 is equally operational if the direction of fluid flow is reversed. When fluid flow is reversed, the impact target surface, of course, is located adjacent point 70 instead of at junction 75, and the channel 74 becomes the connecting channel.

With each of the impact target surface configurations illustrated in FIGS. 3–5 the connecting channels serve identical purposes. They reduce the velocity of fluid leaving the laminar flow channels to minimize turbulence and promote diffusion filtering, and they guide fluid to the laminar flow channels associated with a successive filtration stage. Referring to FIGS. 4 and 5, it is presumed that a closure means cooperates with the shown channels to form closed passages when the system is in operation. The closure means is not shown in FIGS. 4 or 5.

Removal means, for this invention, need not be an impact target surface. For example, if the filtration method selected were interception, a narrow rod, fiber, or bead could be placed in the flow stream as removal means. If the gravity settling method were used, the removal means would constitute a channel or channels where flow could gradually slow down and particles settle to the channel walls. If the centrifugal filtration method were utilized, the removal means might be curved or spiraled channels leading from the downstream ends of laminar flow channels to the connecting channels.

If diffusion filtering were the filtration method to be adopted, the removal means might comprise a channel or system of channels where flow velocity is greatly reduced so as to permit Brownian movement to better function as a filtering agent. After filtration has thus been obtained, fluid would conducted by the connecting channels of the invention to the next filtration stage.

A filtration structure, such as shown in FIGS. 4–6 can be used efficiently for filtering without being embodied in the precise channel systems shown in FIGS. 2 or 7. For example, a plurality of structures could simply be placed in series connection to form a chain of successive filtration structures with the two ends of each connecting channel converging to lead to the upstream end of the laminar flow channel of a filtration structure forming the successive stage.

The intricate combination of filter channels shown on washer 25 in FIG. 2 can be analyzed as a plurality of individual filtration structures like the one shown in part in FIG. 3. Two such filtration structures make up each stage of the filter of FIG. 2. Assuming flow in FIG. 2 to be from the outer edge 58 of the washer 25 toward the core 30, the washer has 10 filtration stages, each stage having 2 filter structures. Individual filtration structures are designated by numbers belonging to the sequence 100, 110, 120, 130 ... 190 .... 200, 210, 220, 230 ... 280, 290. In explaining the relationship between individual filtration structures and successive stages of the filter, I shall first presume that fluid flow originates at the outer edge 58 of the filter washer 25 and proceeds inward along the channels toward the core 30.

The first filtration stage, as counted from the outer edge 58 of the washer 25, contains two filtration structures, namely structures 100 and 200. To reach these filter structures, the fluid at the outer edge 58 enters the washer through openings 101 and 201 which lead to laminar flow channels 102 and 202, respectively, associated with filtration structures 100 and 200, respectively. When flow is from the outer edge 58 toward the core 30, openings 101 and 201 provide entrance means for the fluid. As is clear after examination of FIG. 2, if fluid flow were from the core 30 to the outer edge 58, openings 101 and 201 would represent part of the exit means for the filtered fluid.

FIG. 6 is an edge view of three filter washers stacked one on top of another. The washer 26 is shown below and in contact with washer 25, permitting washer 25 to provide closure means for the channels of washer 26. The channels of washer 26 are thereby transformed into closed passages. The openings 101 and 201 are clearly shown, and it should be noted that the orientation of individual washers is not a factor. The openings 101 and 201 need not be aligned with other such openings or have any particular angular separation from other openings. This greatly eases assembly of the washer into a filter washer stack 24 (FIG. 1). In FIG. 1 the plurality of openings 101 and 201 are shown randomly located about the outer periphery of washer stack 24.

Referring now to FIG. 2, after entering openings 101 and 201 fluid follows laminar flow channels 102 and 202, respectively, until it reaches impact target surfaces located adjacent points 106 and 206, where impaction filtration occurs. The fluid from each laminar flow channel then divides to left and right and follows connecting channels 103 and 203, respectively. Connecting channel 103 extends from point 105 to 205 and intersects laminar flow channel 102; connecting channel 203 extends from point 205 to 105 and intersects laminar flow channel 202. As has already been stated with respect to FIGS. 3–5, the flow velocity in connecting channels is reduced to approximately one half the velocity in the previous laminar flow channel, viz 102 or 202 (FIG. 2).

Directing attention now to filtration structure 100, fluid leaving the impact target surface adjacent point 106 flows along connecting channel 103. A first portion of the fluid travels along channel 103 toward point 105. A second portion travels along channel 103 toward point 205 located at the opposite edge of the washer. Connecting channel 103 thus conducts the fluid to the laminar flow channels 112 and 212 of filtration structures 110 and 210, respectively, which make up the second filtration stage. As filtration structure 100 conducts fluid to points 105 and 205 via connecting channel 103, filtration structure 200 conducts fluid to points 105 and 205 via connecting channel 203. At points 105 and 205 pairs of flow streams converge and recombine prior to entering the laminar flow channels 112 and 212 of the second filtration stage. After entering those channels, fluid velocity increases to a value approximately twice that of the velocity in channels 103 and 203. In short, the flow velocity in laminar flow channels 112 and 212 is substantially equal to that in laminar flow channels 102 and 202.

Fluid flows along laminar flow channels 112 and 212 and on reaching impact target surfaces located at points 116 and 216, respectively, undergoes impaction filtration. After impaction, the flow divides to left and right in each connecting channel and the fluid velocity drops to approximately half the velocity in laminar flow channels 112 and 212. The flow from laminar flow channel 112 separates to follow connecting channel 113 to its ends at points 115 and 215. The flow leaving laminar flow channel 212 also separates as it enters connecting channel 213 and flows to left and right until reaching the ends of connecting channel 213 at points 115 and 215. As flow reaches points 115 and 215, divided flow streams recombine and fluid is ready to enter the third filtration stage. The third filtration stage consists of filtration structures 120 and 220. Fluid enters laminar flow channels 122 and 222, respectively, of the third stage, at an increased velocity which is approximately equal to the flow velocity in laminar flow channels 112 and 212. At the end of laminar flow channels 122 and 222, fluid encounters impact target surfaces located adjacent points 126 and 226, respectively, which collect contaminant particles. After impaction flow is divided equally to left and right along connecting channels 123 and 223 of structures 120 and 220, respectively, of the third stage, and the velocity therein is reduced by half. The connecting channels conduct fluid to the fourth filtration stage which consists of filtration structures 130 and 230.

Fluid passing through structures 130 and 230 undergoes the same impaction filtration process as has been described for the first three filtration stages. At impact target surfaces located adjacent points 136 and 236, the flow, as before, divides to follow connecting channels 133 and 233, respectively, and flow velocity is reduced.

Since the operation of the filtration structures of each filtration stage is essentially identical, the detailed operation of stages 5,6,7,8, and 9 will not be described in detail; should it be desirable to trace the fluid flow through the system of channels forming these stages, no difficulties should arise. Corresponding elements of each filtration structure are designated by similar numbers; for example, each filtration structure has a number, 100 or greater, which is an integer multiple of 10; each laminar flow channel has a number whose final digit is 2; each connecting channel has a number whose final digit is 3.

As fluid flow passing across filter washer 25 reaches the final filtration stage, namely the tenth stage, it flows along laminar flow channels 192 and 292 of filtration structures 190 and 290, respectively. After particles are removed at impact target surfaces adjacent points 196 and 296, flow continues along connecting channels 193 and 293, respectively, and leaves the washer by exit means provided by openings 199 and 299, respectively. Flow has now reached the central core 30 of the washer 25.

Referring now to FIG. 1, when the many filter washers such as washer 25, are fully assembled and aligned in washer stack 24 and the filter assembly 10 fully assembled, pressurized fluid enters inlet passage 20 and flows into reservoir 22. From the reservoir 22, fluid enters the many small openings such as 101, 201 in the filter stack 24 which are identical to those shown at 101, and 201 in FIG. 2. Fluid passes across the many filter washer plates by following the intricate channel system 27 thereon and ultimately reaches washer stack core 32 (FIG. 1). The fluid then flows along washer stack core 32 and passes through upper collar 40 and into outlet passage 42. The fluid has now been fully filtered.

Up to this point the description of filtration action in filter washer 25 has assumed that the direction of fluid flow is from the outer edge 58 toward the central core 30. As stated earlier, the washer system 27 is equally operational with flow originating at the central core 30 and passing across the washer plate 25 to the outer edge 58. One difference, however, does exist between center-to-edge and edge-to-center filtering. If the flow originates at the outer edge 58 and flows toward the center core 30, it passes through ten filter stages. If the flow originates at the center core 30 and moves toward the outer edge 58, it passes through nine stages. The difference occurs at filter structures 100 and 200. When flow is toward the outer edge 58, these two filter structures have no impact target surfaces to perform filtration operations, and hence these two structures do not form an operational filter stage when flow is from core 30 toward the outer edge 58.

In operation, when flow is from the core 30 toward the outer edge 58, openings 199 and 299 and channels 193 and 293, adjacent the core, provide entrance means for fluid and conduct the fluid to the first filtration stage (as measured from the core 30). The fluid, after entering openings 199 and 299, flows along channels 193 and 293, respectively, until it reaches laminar flow channels 192 and 292, respectively, of the first filtration stage. It should particularly be noted that the impact target surfaces formerly provided adjacent points 196 and 296 when flow was from the outer edge 58 toward the core 30 no longer serve as impact target surfaces. No impaction occurs at surfaces adjacent points 196 and 296. Filtration structures 190 and 290, instead, have their impact target surfaces adjacent points 185 and 285. After impaction filtering occurs at the first-stage impact target surfaces adjacent points 185 and 285 the fluid enters connecting channels 194 and 294 of the first filtration stage. Channel 194 extends between points 186 and 286 and intersects the downstream end of laminar flow channel 192; channel 294 extends between points 286 and 186 and intersects laminar flow channel 292. It should be noted that filtration structures 190 and 290 utilize connecting channels 194 and 294, respectively, when flow is from core-to-edge, and connecting channels 193 and 293 when flow is from edge-to-core. The connecting channel is always located at the downstream end of the laminar flow channel. The flow divides to left and right as it leaves laminar flow channels 192 and 292, and velocity of flow is reduced to approximately half the velocity in laminar flow channels 192 and 292. Fluid leaving point 185 flows along connecting channel 194 which extends between points 286 and 186. Simultaneously, fluid leaving point 285 flows through channel 294 to reach points 286 and 186. At points 286 and 186 pairs of reduced velocity fluid streams combine and enter the laminar flow channels of the second filtration stage, as counted from the core. This second filtration stage consists of filtration structures 180 and 280.

Fluid flows along laminar flow channels 182 and 282 of structures 180 and 280, respectively, becoming laminar prior to reaching impact target surfaces located adjacent points 175 and 275, respectively. Fluid then enters the connecting channels 184 and 284 associated with the second filtration stage, as measured from the core. Connecting channel 184 extends between points 176 and 276 and intersects the downstream end of laminar flow channel 182; connecting channel 284 extends between points 276 and 176 and intersects the downstream end of laminar flow channel 282. In these connecting channels fluid velocity is approximately one half that in laminar flow channels 182 and 282. As pairs of flow streams converge at points 176 and 276, they combine to enter the third filtration stage (as measured from the core), which consists of filtration structures 170 and 270. In this third stage, the filtration process is identical to that described in the first and second stages. At every filtration structure through which fluid passes in traveling from the core 30 to the outer edge 58, it undergoes the same filtration process which has already been described in detail for the first two stages. It should be understood that when fluid flow is from the core 30 to the edge 58, the impact target surfaces are not located at the same end of the laminar flow channel as when flow is from the edge 58 to the core 30; the impact target surfaces are then located at the opposite end of the laminar flow channels at points such as 165, 265, 155, 255, 145, 245, etc.

Ultimately, the fluid reaches the final filtration stage containing structures 110 and 210 and after colliding with impact target surfaces adjacent points 105 and 205 enters connecting channels 114 and 214, respectively, which conduct the fluid to channels 102 and 202. Channels 102 and 202 and openings 101 and 201, collectively, provide exit means for the fluid when the flow direction is from the core 30 to the outer edge 58.

When the flat unchanneled blank surface of a second washer or some other closure means is compressed against the channel system of a washer, the channels become closed on all sides to form passages which can contain the flowing fluid. To operate effectively, the washer channels must, of course, be closed to form passages.

It has been found that space on the washer surface is greatly conserved when portions of connecting channels are formed as concentric circular channels. Accordingly, arcs of the connecting channels have been made concentric whenever possible. Straight line channels have been used to join circular portions where convenient to "offset" one laminar flow channel from another. This "offsetting" permits one to have a large number of laminar flow channels of considerable length in a small surface area.

It should be understood that when fluid flows from the core 30 toward the outer edge 58, the fluid is supplied to the filter assembly 10 (FIG. 1) through passage 42. Fluid is thus directed into the stack core 32 and enters the openings 199, 299 (FIG. 2) of individual washers. Fluid leaving the washers enters the reservoir 22 (FIG. 1) and then leaves the filter assembly 10 by passage 20.

A second embodiment of the invention is shown in FIG. 7. The filter channel system of FIG. 7 is equally operational whether flow is from the outer edge 302 of washer 300 toward the core 390 or visa versa. The structural characteristics and operation of the embodiment of the invention shown in FIG. 7 will now be explained in detail with the assumption that fluid flow is from the outer edge 302 toward the core 390.

The washer 300 shown in FIG. 7 can be used in the washer stack 24 of the filter assembly 10 shown in FIG. 1. Fluid is, of course, supplied by the filter assembly 10 to individual washers in the washer stack 24 in the same manner as already described for the channel system of FIG. 2.

Plane 8—8 is shown dividing the washer plate of FIG. 7 into two substantially equivalent halves. The channel system shown in the upper half of FIG. 7 is identical to that shown in the lower half. To simplify the description of this embodiment, only the lower half of the washer plate will be described in detail, since structural characteristics and operation of the upper half are identical.

In FIG. 8 the lower half of the washer 300 of FIG. 7 is shown greatly enlarged. A plurality of openings such as 310, 312, 314, 316, 318, and 319 are positioned at spaced intervals along the outer edge 302 of the lower half of washer 300. It will be observed that the upper half of the washer 300 has a plurality of like openings spaced along the outer edge. (FIG. 7).

The openings in the outer edge 302 of washer 300 (FIG. 8) supply entrance means for fluid flowing into the filter washer 300 when flow is directed from the outer edge 302 toward the core 390. Fluid entering the openings flows along individual laminar flow channels such as 320, 322, 324, 326, 328, or 329. To illustrate, fluid entering opening 314 flows along laminar flow channel 324. Each of these laminar flow channels are made of sufficient length to establish laminar fluid flow before the fluid reaches the downstream end of the laminar flow channel. As stated earlier, to obtain laminar flow, the walls should be reasonably smooth and straight and the channel of appropriate length to reduce turbulence.

Since all the filtration structures within the lower half of the washer of FIG. 8 are similar, I shall henceforth concentrate my description upon the fluid entering openings 312, 314, and 316 and the filtration structures associated with those openings. When one understands the behavior of fluid entering the washer by these openings, the operation of the entire filter washer 300 is easily understood.

Fluid flowing along laminar flow channel 322 reaches connecting channel 330 which extends from point 331 to point 333 and intersects the downstream end of laminar flow channel 322. At the intersection between laminar flow channel 322 and connecting channel 330, an impact target surface is formed adjacent point 334. Fluid reaching the downstream end of laminar flow channel 322 has laminar flow characteristics, and particles carried by the fluid are traveling at the velocity of the fluid. As fluid reaches the intersection with connecting channel 330, it is forced to divide to left and right to follow connecting channel 330. Since the particles carried by the fluid have greater mass than the fluid molecules, their momentum tends to carry them straight ahead instead of permitting them to turn to follow channel 330. Particles colliding with the impact target surface adjacent point 334 adhere to it and are removed from the fluid. As the fluid divides on entering connecting channel 330, its velocity is reduced to approximately half the velocity found in laminar flow channel 322. The combination consisting of laminar flow channel 322, connecting channel 330 with an impact target surface adjacent point 334, and closure means (not shown) collectively form filtration structure 332 which is similar in form and purpose to the filtration structures making up the embodiment of the invention shown in FIG. 2. It should be understood that the structure 332 requires closure means for the channels in order to be an operative structure.

As fluid enters laminar flow channel 322, it is simultaneously entering laminar flow channels 324 and 326 through openings 314 and 316, respectively. Fluid reaching the downstream end of laminar flow channel 324 divides to right and left along connecting channel 335 which extends between points 333 and 336. At the inter-section between connecting channel 335 and laminar flow channel 324, an impact target surface if formed adjacent point 337. Similarly, connecting channel 338 extends between points 336 and 339. At the intersection of connecting channel 338 with laminar flow channel 326 an impact target surface is formed adjacent point 340.

The fluid leaving laminar flow channels 324 and 326 divides to left and right along connecting channels 335 and 338, respectively. In each instance, the velocity of fluid flow in the connecting channels is half the velocity in the laminar flow channels. As fluid reaches the ends of laminar flow channels 324 and 326, particles collide with impact target surfaces located adjacent points 337 and 340, respectively, and these colliding particles are removed from the fluid. Laminar flow channel 324, a connecting channel 335 with an impact target surface adjacent point 337, and appropriate closure means, collectively form filtration structure 341.

Another filtration structure 343 is formed by laminar flow channel 326, connecting channel 338 with an impact target surface adjacent point 340, and appropriate closure means. If the filter washer plate is examined as a whole, it will be noted that the entire filter channel system consists of a plurality of like filtration structures.

Connecting channels 330, 335, and 338 have their ends connected to form an arc of a circle; this arc is part of a circular channel formed by filtration structures which have the ends of their connecting channels joined together. The plurality of filtration structures whose connecting channels form arcs of the same circle are to be considered as belonging to the same stage. When flow is from the outer edge 302 toward the core 390 the structures whose connecting channels form the circular channel of largest diameter belong to the first filtration stage. Any fluid passing across the filter washer plate from the outer edge 302 will undergo a first filtration in a filtration structure belonging to this first filtration stage.

It is not essential that the connecting channels be of any specific length. The connecting channels have several purposes: they conduct fluid from the impact target surface of a filtration structure to the laminar flow channels associated with successive filtration structures; they provide a channel wherein velocity is reduced to better facilitate diffusion filtering; in addition, if one connecting channel becomes obstructed, flow will not cease since fluid flows to right and left in each connecting channel thus providing an alternative path.

Fluid from connecting channels of filtration structures 332 and 341 of the first filtration stage converges at point 333 to enter the second filtration stage. Simultaneously, fluid from filtration structures 341 and 343 of the first filtration stage converges at point 336 to enter the second filtration stage. This converging behavior occurs at the ends of each connecting channel on washer 300.

Fluid streams converging at point 333 enter laminar flow channel 342. Fluid streams converging at point 336 enter laminar flow channel 344. After laminar flow is established, the fluid undergoes impaction filtration at impact target surfaces. Flow along laminar flow channel 342 is filtered at an impact target surface adjacent point 345 which is formed by the intersection of connecting channel 346 with laminar flow channel 342. Connecting channel 346 extends between points 347 and 348. Similarly flow proceeding along laminar flow channel 344 encounters an impact target surface located adjacent point 349 which is formed by the intersection of connecting channel 350 with laminar flow channel 344. Connecting channel 350 extends between point 348 and 351. All filtration structures having their connecting channels coincident with the circular channel formed in part by the arcs of connecting channels 346 and 350 are in the second filtration stage.

As the fluid leaves the downstream end of laminar flow channels 342 and 344, it divides to right and left along connecting channels 346 and 350, respectively, and fluid velocity in the connecting channels is reduced to approximately half the velocity in the laminar flow channels. Fluid flow from connecting channels 346 and 350 converges at point 348.

Fluid converging on point 348 enters laminar flow channel 352 and attains laminar flow before reaching the downstream end of the channel. As the fluid leaves laminar flow channel 352 contaminant particles collide with an impact target surface located adjacent point 353 which is formed by the intersection of connecting channel 354 with laminar flow channel 352. Fluid leaving laminar flow channel 352 divides to left and right along connecting channel 354 which extends between points 355 and 356. Laminar flow channel 352 is a part of filtration structure 357 which is in the third filtration stage.

It should be understood that fluid entering the many remaining openings around the outer edge 302 of the washer such as 310, 318, and 319 receives the same filtration action already described for fluid entering the sector of the washer containing openings 312, 314, and 316. The filtration process has been described in detail for fluid flow through portions of the first three stages of the filter. To avoid needless repetition, the details of filtration in the fourth, fifth, and sixth stage will not be intricately described since they are similar to filtration in the first three stages. A slight change in behavior occurs in the fifth, sixth, and seventh stages, but this will be described hereafter.

As fluid reaches the seventh and final filtration stage, it enters laminar flow channels associated with that stage such as laminar flow channel 381. After impact filtering occurs at an impact target surface located adjacent point 382, fluid enters connecting channel 383 which extends between points 384 and 385. Fluid flowing along connecting channel 383 of the seventh stage leaves the filtration structure through channels 387 and 388 which lead to interior openings 389 and 391. The channels 387 and 388 with interior openings 389 and 391, collectively, comprise exit means for the fluid leaving the washer. Naturally, other channels and interior openings around the periphery of the central core 390, such as channels 394 and 395 and openings 392 and 393, though not described in detail, also constitute exit means when fluid flow is from the outer edge 302 toward the core 390.

As fluid leaves the final filtration stage of the washer 300, it enters the stack core 24 (FIG. 1) and then leaves the filter assembly by passage 42.

As stated earlier, as one encounters the fifth filtration stage of the washer 300 (FIG. 8) some slight differences in fluid flow occur. Fluid leaving the connecting channels of the fourth filtration stage encounter fewer laminar flow channels in the fifth stage than were present in stages one through four. The number of laminar flow channels in the fifth filtration stage has deliberately been reduced because this increases the velocity of fluid entering the laminar flow channels of the fifth stage. As velocity is increased, even smaller particles can be removed by impaction filtering. It should be understood that this reduced number of laminar flow channels need not have been incorporated in this filter washer and that the number of laminar flow channels in the fifth and later stages could have been kept at a number which would not have introduced a higher velocity of flow. In addition, the reduction of the number of laminar flow channels could have occurred in the fourth stage, the sixth stage, etc., depending on filtration requirements.

The filtration process occurring with filter washer 300 will now be described in detail when fluid flow originates at the core 390 and flows across the washer toward the outer edge 302. In such a case, fluid enters the filter assembly 10 (FIG. 1) by passage 42 which leads to washer stack core 32. Fluid then has reached the washer 300 FIGS. 7 and 8).

Fluid flow originating at the central core 390 (FIG. 8) enters interior openings such as 389, 391, 392, and 393. These interior openings provide entrance means for the fluid when fluid flow originates at the central core. Fluid next enters individual filtration structures and flows along the corresponding laminar flow channels of each structure until it reaches the downstream end of each channel. For example, fluid entering interior opening 389 flows along laminar flow channel 387 of filtration structure 407; fluid entering interior opening 391 flows along laminar flow channel 388 of filtration structure 408. By the time fluid reaches the downstream end of the individual laminar flow channels, the fluid has attained laminar flow. Since the individual construction and operation of each filtration structure is essentially like that of all others, the operation of the filter will only be described in detail for the filter structure 407 and 408 in the first filtration stage, as counted from the core 390. As flow reaches the downstream end of laminar flow channels 387 and 388, impact filtering occurs at impact target surfaces located adjacent points 384 and 385, respectively. Flow from structure 407 then divides to left and right along connecting channel 396 which extends from point 382 to point 397. Simultaneously, fluid flow leaving the downstream end of laminar flow channel 388 of filtration structure 408 divides to left and right along connecting channel 409 which extends between points 382 and 410.

Portions of the fluid flow from connecting channels 396 and 409 converge at point 382 to enter laminar flow channel 381 of the second filtration stage. As the fluid reaches the downstream end of channel 381, it undergoes impaction filtration at an impact target surface adjacent point 411 and then divides to left and right along connecting channel 412 which extends from point 413 to point 414. Laminar flow channel 381 and connecting channel 412 with its impact target surface along with appropriate closure means form filtration structure 415.

It should be understood that fluid flow continues from the central core 390 toward the outer edge 302 of the filter by passing through successive filtration structures associated with successive filtration stages until ultimately the flow reaches the final filtration stage. When flow is from the central core 390 toward the outer edge 302, a final filtration stage is composed of filtration structures such as structures 420 and 422. Fluid reaching structure 420 flows along laminar flow channel 342 and undergoes impaction filtration at an impact target surface located adjacent point 333. It then divides to left and right along connecting channel 424 which extends between points 334 and 337. Fluid from laminar flow channel 344 of structure 422 divides to left and right as it enters connecting channel 425 extending between points 337 and 340.

At point 337, two streams of fluid converge to enter channel 324. Fluid leaves the washer through opening 314. It should be understood that structures 420 and 422 were chosen as typical of the many structures in the final filtration stage and that the many like structures perform an analogous filtering operation. When flow is from the central core 390 to the outer edge 302, outer channels such as channels 322, 324, 326, etc., connecting with openings 312, 314, 316 and the like provide exit means for the fluid flow. Fluid next enters reservoir 22 (FIG. 1) and then flows through passage 20 to leave the filter assembly 10.

It should be noted that the impact target surface for each filtration structure (FIGS. 2, and 4-8) is always located at the downstream end of the laminar flow channel associated with the structure. Thus, depending upon the direction of flow, the impact target surface of a given filtration structure may be at either end of the laminar flow channel.

It should be understood that fluid flowing through the connecting channels in the filter washer shown in FIG. 7 and 8 is traveling at a velocity less than that present in laminar flow channels. This lowered velocity results in improved diffusion filtering in the connecting channels. In this way, many small particles which would otherwise not be removed can be eliminated from the fluid during its travel through the connecting channels.

The embodiments shown in FIGS. 2, 7, and 8 utilize both impaction filtering, and diffusion filtering. In each embodiment, fluid velocity is halved as it enters connecting channels; this reduction facilitates diffusion filtering, which operates best at lowered velocities.

FIG. 9 illustrates a channel variation which can be utilized with the channel washer system of FIGS. 2 or 7. The filter washer 452, shown in part in FIG. 9, is illustrated with two filtration stages thereon. The filtration structure 455 is a part of the first filtration stage. It should be noted that the effective diameter of all channels in the first filtration stage is constant. The second filtration stage, which contains filtration structures 465 and 475, has the diameter of its channels reduced. This reduction in channel diameter has been found helpful to increase the flow velocity from one filtration stage of a filter washer to the next, thereby permitting smaller particles to be removed at successive stages. In addition, it has been found that where it is necessary to coalesce fine droplets of mist or oil vapor it is helpful to utilize at least one narrowed diameter channel filtration stage to better coalesce the droplets and thus remove them from the fluid.

The extent to which channels of a successive filtration stage should have their effective diameter reduced depends on the application intended for the filter. Ordinarily, one would reduce the effective diameter of a successive filtration stage by at least a factor of 2 over the preceeding stage. This would make the channels of the successive stage half the effective diameter of the channels of the preceeding stage. Seldom would one wish to decrease the successive filtration stage channel diameters by more than a factor of 10. It should be understood that reducing the channel diameter results in increased velocity, but naturally the volume of fluid passing through the reduced channel diameter filtration stage is somewhat reduced. The original volume of fluid can be restored by increasing the number of filtration structures in the filtration stages where channel diameter has been reduced.

The channel diameter variation principle illustrated in FIG. 9 can be utilized in the channel system shown in FIGS. 2 or 8. If desired, the effective diameter of channels can decrease with each successive filtration stage. Alternatively, the filter system can contain a set of filtration stages having a fixed effective diameter for all channels within that set, and additional sets of successive stages with a different effective diameter for each set can be provided as required.

Individual washers, whether embodying the design of FIG. 2 or 7, can be fabricated from a variety of different materials depending upon the application intended. Possible materials include plastic, glass, ceramics, or almost any metal or alloy thereof. Of the metal group, stainless steel or aluminum has been found to function well. If a high temperature application is planned, it is advisable to choose a material which has a relatively high melting point. Stainless steel filter washers can operate efficiently in temperatures as high as 1,000° C. Naturally, the other components making up the filter assembly 10 shown in FIG. 1 must be made of material capable of withstanding the same high temperatures. The channel system can be formed in the filter washers in a variety of ways such as etching or stamping.

It has been found that a stacked washer filter is an excellent filter for applications where large pressures are involved. The sturdy filter washer stack used with the invention can withstand pressures as high as 5,000 psi without danger of collapse. Naturally, the casing should have a compatible strength. The device is well adapted to be connected to standard factory air pressure supply sources which ordinarily are in the 90–100 psi range. Typically a pressure drop of approximately 20 psi occurs across the filter when it is in operation.

Another advantage of this invention is that when it ultimately becomes saturated with particles, it is easily cleaned. To clean the individual filter washers, one disconnects the casing 14 from the head 12 (FIG. 1) and then withdraws the washer stack 24 from the casing 14. One then unthreads nut 48, and the individual washers can be removed from rod 44 for cleaning. Emersion in an appropriate cleaning solution, scrubbing, ultrasonic cleaning or other appropriate means will remove the accumulated surface particles on the filter washers. If the filter unit is used to purify gases at high temperatures, such as 1000° C, the filter washers become so hot that solid organic dirt particles lodged therein literally disintegrate. At this temperature solid organic particles are converted to a gaseous state. In effect, the filter washer stack 24, at such a temperature, becomes a self-cleaning oven.

When reassembling the washer stack 24, no orientation problems, aside from vertical alignment, exist. The positioning of openings such as 101 and 102 (FIG. 2) along the outer periphery requires absolutely no attention. This fact greatly diminishes the toil of reassembling the washer stack.

The size of individual washers can be varied according to need. It has been found that circular washers having an outer diameter of approximately 1.625 inches and an inner diameter of approximately 0.75 inches function well for most filter applications. Ordinarily, individual washers are quite thin, i.e., 0.005 inch thick, but this is variable depending on the application. Typically, individual channels have widths ranging between 0.004 and 0.010 inch, although this range is not compulsory. The depth of an individual channel is commonly about 0.0025 inches. In determining the width and depth dimensions of individual channels, it is helpful to first know the sizes of contaminant particles which are to be removed. The smallest channel dimension (either width or depth) should be at least 10 times the diameter of the largest expected particle. If channels are made smaller, the risk of channel clogging is greatly increased. If one expects occasional particles of diameter equal to or greater than one tenth of the smallest channel dimension, it would be prudent to install a prefilter to remove these large particles before sending the fluid through the channels of my filter invention.

In the embodiments shown in FIGS. 2 and 7, the width and depth of individual channels is constant throughout the filter washer. If desirable, it is possible to vary the width or depth of the individual channels from one stage of the washer to the next. For example, the first three stages of the filter washer shown in FIG. 2 could have channels widths of 0.010 inch and the remaining stages could have channel widths of 0.004 inch. With such variation, the more coarse particles would be removed by the first three stages and finer materials by the final stages where the channels are of smaller width. It should be understood that a decrease in the width of a laminar flow channel permits a decrease in the length of the laminar flow channel without adversely affecting laminar flow. By such a decrease in width, a greater number of filtration stages can be placed in a given area.

If desired, it is possible to use a washer stack consisting of a mixture of washers. The stack could contain washers of the type described in FIG. 2 and also washers of the type shown in FIG. 7. A single washer design is not essential to the filter assembly 10 to obtain efficient filtration.

The number of required filtration stages per washer needed for a particular application is easily computed using the following relationship:

$$\text{Number of required stages} = \frac{\text{Log}_{10} (1-E_f)}{\text{Log}_{10} (1-E_s)}$$

where $E_f$ = the required efficiency of a filter having the required number of stages and $E_s$ = the efficiency of an individual filtration stage. Efficiency is the ratio of particles removed from the fluid during filtration to particles in the fluid prior to filtration.

While I have described several preferred embodiments of the present invention, it should be understood that various changes, adaptions and modifications may be made therein within departing from the spirit of the invention and the scope of the appended claims.

What is claimed is:

1. A fluid flow filter for removing contaminant particles dispersed in a fluid comprising:

a filter body a fluid flow passage for conducting fluid through said body, said fluid flow passage including a substantially straight smooth section of sufficient length to permit fluid flowing therealong to develop laminar flow characteristics, said substantially straight smooth section comprising a laminar flow section; and particle removal means disposed at the downstream end of said laminar flow section for interacting with the laminar flowing fluid and removing dispersed particles from said fluid.

2. The combination according to claim 1 wherein said body has a plurality of fluid flow passages, and each of said fluid flow passages has a plurality of successive laminar flow sections and particle removal means, one of said particle removal means located at the downstream end of each successive laminar flow section thereby forming successive filtration stages.

3. The combination according to claim 2 wherein said fluid flow passages further include a plurality of connecting segments, wherein each connecting segment intersects the downstream end of a given laminar flow section and extends between the upstream ends of at least two successive laminar flow sections when there are laminar flow sections successive to the given laminar flow passage.

4. A fluid flow filter for removing contaminant particles dispersed in a fluid comprising:

a filter body a plurality of fluid passages for conducting fluid through said body, each fluid flow passage having a plurality of successive smooth sections of sufficient length to permit fluid flowing therealong to develop laminar flow characteristics forming successive filter stages, said smooth sections comprising laminar flow sections, and a plurality of connecting segments, wherein each connecting segment intersects the downstream end of a given laminar flow section and extends between the upstream ends of at least two successive laminar flow sections where there are laminar flow sections successive to the given laminar flow sections, and wherein the effective stage diameter of at least one filter stage is different from the effective stage diameter of the preceding filter stage; and particle removal means disposed at the downstream ends of said laminar flow sections for interacting with the laminar flowing fluid and for removing dispersed particles from said fluid.

5. The combination according to claim 4 wherein the effective diameter of each laminar flow section in at least one successive filtration stage is smaller than the effective diameter of each laminar flow section in the preceding stage, and thus each successive stage removes smaller particles.

6. The combination according to claim 4 wherein the number of laminar flow sections and particle removal means in at least one stage differs from the number of laminar flow sections and particle removal means in a subsequent stage, such that fluid flow velocity can be varied from stage to stage to improve filtration efficiency.

7. A fluid flow filter for removing contaminant particles dispersed in a fluid comprising:
a filter body;
a fluid flow passage for conducting fluid through said body, each fluid flow passage having a plurality of successive smooth sections of sufficient length to permit fluid flowing therealong to develop laminar flow characteristics forming successive stages, and a plurality of connecting segments, wherein each connecting segment intersects the downstream end of a given smooth section and extends between the upstream ends of at least two successive smooth sections where there are successive smooth sections to a given smooth section, and wherein, the effective diameters of the individual smooth sections of successive stages are smaller than the effective diameters of the individual smooth sections of the preceding stage and the number of smooth sections of said successive stages are increased so that the effective stage diameters of the successive stages are equal; and
particle removal means disposed at the downstream ends of each of said smooth section for interacting with the laminar flowing fluid and for removing dispersed particles from said fluid.

8. The combination according to claim 1 wherein said particle removal means is an impact target surface.

9. The combination according to claim 1 wherein said laminar flow section has length and width dimensions such that the ratio of length to effective diameter is not less than ten.

10. The combination according to claim 9 wherein said ratio of length to effective diameter is between 20 and 30.

11. A filter with a plurality of successive filtration stages therein for purifying fluid flow comprising:
a filter body having entrance and exit means for fluid flow;
a plurality of individual fluid flow passages for conducting fluid through said body, said passage including successive substantially straight sections of sufficient length to permit fluid reaching the downstream ends thereof to develop laminar flow characteristics said straight sections forming laminar flow sections, and a plurality of connecting segments in said fluid flow passage, each connecting segment joins the downstream end of a given laminar flow section with the upstream ends of two laminar flow section associated with a successive filtration stage, when there is a successive stage, and having an impact target at the junction of the downstream end of the laminar flow section and said connecting passage;
said entrance means conducting fluid to said fluid flow passages and said exit means conducting fluid from the final filtration stage out of the filter body.

12. A filter having a plurality of successive filtration stages therein for purifying fluid flow comprising:
a plate having entrance and exit means for fluid flow;
a plurality of individual laminar flow channels formed on said plate, all such channels being smooth and of sufficient length to permit fluid reaching the downstream ends thereof to develop laminar flow characteristics;
a plurality of connecting channels on said plate, each of said connecting channels intersecting the downstream end of an individual laminar flow channel and having an impact target surface at the intersection, each connecting channel extending to the upstream end of a successive laminar flow channel when a successive laminar flow channel is present;
said entrance means conducting fluid to the laminar flow channels associated with a first filtration stage and said exit means conducting fluid from the connecting channels associated with a final filtration stage out of the plate; and
closure means cooperating with said plate to form closed passages of the channels on said plate.

13. The combination according to claim 14 wherein each of said connecting channels forms an arc of a circle, connecting channels of successive stages having their arcs concentric.

14. The combination according to claim 12 wherein portions of each connecting channel form arcs of circles, the arc portions of the connecting channels of successive stages being concentric.

15. The combination according to claim 12 wherein said plate is annular and said laminar flow channels are arranged radially thereon.

16. A filter with a plurality of successive filtration stages therein for purifying fluid flow comprising:
a filter body having entrance and exit means for fluid flow;
a plurality of individual laminar flow passages in the body said passages being smooth and of sufficient length to permit fluid reaching the downstream ends thereof to develop laminar flow characteristics;
means in said body providing connection between the upstream ends of two laminar flow passages associated with a successive filtration stage, said means intersecting the downstream end of an individual laminar flow passage, an impact target surface being formed by the intersection of said connection means with said downstream end of said laminar flow passage; and
said entrance means conducting fluid to the laminar flow passages associated with a first filtration stage, and said exit means conducting fluid from the connecting passages associated with a final filtration stage out of the said filter body.

17. A filter having a plurality of successive filtration stages therein for purifying fluid flow comprising:
a plate having entrance and exit means for fluid flow;
a plurality of individual laminar flow channels formed on said plate, all channels being substantially straight and of sufficient length to permit fluid reaching the downstream ends thereof to develop laminar flow characteristics;
a plurality of connecting channels on said plate, each of said connecting channels intersecting the downstream end of an individual laminar flow channel and having an impact target surface at the intersection, each connecting channel extending between the upstream ends of two laminar flow channels associated with a successive filtration stage when a successive filtration stage is present;
said entrance means conducting fluid to the laminar flow channels associated with a first filtration stage and said exit means conducting fluid from the connecting channels associated with a final filtration stage out of the plate; and
closure means cooperating with said filter plate to form closed passages of the channels on said plate.

18. A filter washer for use with a plurality of other like washers which, when aligned and compressed collectively form a stacked washer filter element with a plurality of successive filtration stages on each washer for purifying fluid flow comprising:
said washer having substantially flat first and second surfaces with a core extending therebetween and terminating at each of said surfaces, said core spaced from the outer edges of said plate;
a plurality of individual laminar flow channels of sufficient length to permit fluid reaching the downstream ends thereof to develop laminar flow characteristics, said laminar flow channels located on said first surface of said plate;
a plurality of connecting channels on said first surface of said plate, each of said connecting channels intersecting the downstream end of an individual laminar flow channel and having an impact target surface at the intersection and each connecting channel extending between the upstream ends of two laminar flow channels associated with a successive filtration stage when a successive filtration stage is present;
means conducting fluid to the laminar flow channels associated with a first filtration stage, and from the connecting channels associated with a final filtration stage out of the said filter washer plate; and all of the channels, conducting means, and impact target surfaces on said first surface of said plate cooperating with the flat second surface of a like plate to form closed passages across the said plate when two like plates are aligned and compressed.

* * * * *